(12) United States Patent
Nuttall et al.

(10) Patent No.: US 9,050,994 B2
(45) Date of Patent: Jun. 9, 2015

(54) TOY VEHICLE RACEWAY AND ROLLING CART

(75) Inventors: Michael Wayne Nuttall, South Pasadena, CA (US); Brendon Vetuskey, Long Beach, CA (US); Stacy L. O'Connor, El Segundo, CA (US)

(73) Assignee: Mattel, Inc., El Segundo, CA (US)

( * ) Notice: Subject to any disclaimer, the term of this patent is extended or adjusted under 35 U.S.C. 154(b) by 328 days.

(21) Appl. No.: 13/299,992

(22) Filed: Nov. 18, 2011

(65) Prior Publication Data

US 2012/0126022 A1 May 24, 2012

Related U.S. Application Data

(60) Provisional application No. 61/415,180, filed on Nov. 18, 2010.

(51) Int. Cl.
| | | |
|---|---|---|
| A63H 18/04 | (2006.01) | |
| B62B 1/14 | (2006.01) | |
| B62B 1/22 | (2006.01) | |
| B62B 1/26 | (2006.01) | |

(52) U.S. Cl.
CPC ........ B62B 1/14 (2013.01); A63H 18/04 (2013.01); B62B 1/22 (2013.01); B62B 1/26 (2013.01); *B62B 2202/00* (2013.01)

(58) Field of Classification Search
CPC ............ A63H 18/04; B62B 1/14; B62B 1/26; B62B 1/22; B62B 2202/00
USPC ........... 238/10 A, 10 R; 104/60; 280/30, 651; 182/20
See application file for complete search history.

(56) References Cited

U.S. PATENT DOCUMENTS

| 300,496 | A | * | 6/1884 | Nelson ........................ 280/30 |
|---|---|---|---|---|
| 738,586 | A | | 9/1903 | Wilson |
| 1,278,203 | A | | 9/1918 | Pierce |
| 1,462,189 | A | | 7/1923 | Brooker |
| 1,493,649 | A | | 5/1924 | Schulz |
| 1,662,162 | A | | 3/1928 | Nestor |
| 1,703,117 | A | | 2/1929 | Marx |

(Continued)

FOREIGN PATENT DOCUMENTS

| DE | 3106081 | 8/1982 |
|---|---|---|
| DE | 3106123 | 8/1982 |

(Continued)

OTHER PUBLICATIONS

USPTO, Office Action for U.S. Appl. No. 11/744,781; Mailing Date Dec. 18, 2008; 19 pages. Application issued as US 7,651,398 on Jan. 26, 2010.

(Continued)

*Primary Examiner* — Mark Le
(74) *Attorney, Agent, or Firm* — Kolisch Hartwell, PC

(57) ABSTRACT

A toy vehicle raceway and rolling cart may include a plurality of multilane track segments, each of which may have a corresponding pivotably mounted support bracket. A toy vehicle raceway may be capable of being assembled in a plurality of configurations, including a racing configuration wherein the track segments and brackets may be assembled as a ramped raceway and a transport configuration wherein one or more of the track segments and brackets may be assembled to form a rolling cart for securely carrying other raceway components.

25 Claims, 8 Drawing Sheets

(56) References Cited

U.S. PATENT DOCUMENTS

| | | |
|---|---|---|
| 2,161,314 A | 6/1939 | Randall et al. |
| 2,726,869 A | 12/1955 | Schulte |
| 2,736,556 A | 2/1956 | Dasher |
| 2,853,301 A | 9/1958 | Glass |
| 3,209,491 A | 10/1965 | Roeper |
| 3,315,632 A | 4/1967 | Hyden |
| 3,376,844 A | 4/1968 | Wood |
| 3,411,783 A | 11/1968 | Montagna |
| 3,456,596 A | 7/1969 | Cooper |
| 3,496,674 A | 2/1970 | Cooper |
| 3,502,332 A | 3/1970 | Wolf |
| 3,565,430 A | 2/1971 | McRoskey |
| 3,589,055 A | 6/1971 | Stormon |
| 3,618,947 A | 11/1971 | Cooper et al. |
| 3,658,333 A | 4/1972 | Carcel |
| 3,712,615 A | 1/1973 | Staats et al. |
| 3,777,394 A | 12/1973 | Staats et al. |
| 3,827,693 A | 8/1974 | Barlow et al. |
| 4,077,628 A | 3/1978 | Hebert |
| 4,108,437 A | 8/1978 | DeAnda et al. |
| 4,147,351 A | 4/1979 | Saito |
| 4,153,250 A | 5/1979 | Anthony |
| 4,185,409 A | 1/1980 | Cheng |
| 4,273,332 A | 6/1981 | Buck et al. |
| 4,285,157 A | 8/1981 | Lambert |
| 4,349,983 A | 9/1982 | Kilroy et al. |
| 4,355,807 A | 10/1982 | Prehodka |
| 4,382,599 A | 5/1983 | Tilbor |
| 4,383,688 A | 5/1983 | Prehodka |
| 4,504,012 A | 3/1985 | Fetty et al. |
| 4,513,966 A | 4/1985 | Mucaro et al. |
| 4,550,910 A | 11/1985 | Goldfarb et al. |
| 4,605,229 A | 8/1986 | McKay |
| 4,661,080 A | 4/1987 | Goldstein et al. |
| 4,715,602 A | 12/1987 | May et al. |
| 4,755,159 A * | 7/1988 | Templeton et al. .............. 446/76 |
| 4,872,680 A | 10/1989 | Dennis |
| 4,887,837 A * | 12/1989 | Bonewicz et al. ............ 280/654 |
| 4,937,207 A | 6/1990 | Simmell et al. |
| 5,174,569 A | 12/1992 | Ngai |
| 5,403,004 A | 4/1995 | Kennedy |
| 5,452,893 A | 9/1995 | Faulk et al. |
| 5,542,668 A | 8/1996 | Casale et al. |
| 5,651,736 A | 7/1997 | Myers |
| 5,683,298 A | 11/1997 | Jackson |
| 5,813,351 A | 9/1998 | Chen |
| 6,099,380 A | 8/2000 | Rasmussen |
| 6,109,186 A * | 8/2000 | Smith et al. .................... 104/295 |
| 6,227,932 B1 | 5/2001 | Ngai |
| 6,358,112 B1 | 3/2002 | Lambert et al. |
| 6,386,538 B1 | 5/2002 | Mejia |
| 6,517,007 B2 | 2/2003 | Kong |
| 6,601,774 B1 * | 8/2003 | Kasimoff .................... 238/10 R |
| 6,647,893 B1 | 11/2003 | Fugitt et al. |
| 6,780,078 B2 | 8/2004 | Hageman et al. |
| 6,913,508 B2 | 7/2005 | Hornsby et al. |
| 7,241,223 B1 | 7/2007 | Caudill |
| 7,285,035 B1 | 10/2007 | Tullis |
| 7,347,764 B2 | 3/2008 | Choi |
| 7,537,509 B2 | 5/2009 | Payne et al. |
| 7,601,068 B1 | 10/2009 | McGee |
| 7,628,674 B2 | 12/2009 | Nuttall et al. |
| 7,637,796 B2 | 12/2009 | Hippely |
| 7,651,398 B2 * | 1/2010 | Ostendorff et al. ............. 463/60 |
| 7,690,964 B2 | 4/2010 | Nuttall et al. |
| 7,766,720 B2 | 8/2010 | Ostendorff |
| 2002/0195502 A1 | 12/2002 | Delage |
| 2004/0087242 A1 | 5/2004 | Hageman et al. |
| 2005/0287919 A1 | 12/2005 | Sheltman et al. |
| 2007/0037479 A1 | 2/2007 | Margay |
| 2007/0197127 A1 | 8/2007 | Ostendorff et al. |
| 2007/0293122 A1 | 12/2007 | O'Connor et al. |
| 2008/0014832 A1 | 1/2008 | Ostendorff et al. |
| 2008/0268743 A1 | 10/2008 | O'Connor et al. |
| 2009/0072481 A1 | 3/2009 | Ostendorff |
| 2010/0081356 A1 | 4/2010 | Lutchen et al. |
| 2011/0269371 A1 | 11/2011 | Nuttall et al. |

FOREIGN PATENT DOCUMENTS

| | | |
|---|---|---|
| GB | 2068754 | 8/1981 |
| WO | 2007131212 | 11/2007 |

OTHER PUBLICATIONS

USPTO, Final Office Action for U.S. Appl. No. 11/744,781; Mailing Date Jun. 24, 2009; 15 pages. Application issued as US 7,651,398 on Jan. 26, 2010.

The International Bureau of WIPO, Ellen Moyse, Authorized Officer; International Preliminary Report on Patentability for PCT/US2007/068306; mailing date Nov. 13, 2008; 4 pages.

* cited by examiner

TOY VEHICLE RACEWAY AND ROLLING CART

CROSS-REFERENCE TO RELATED APPLICATIONS

This application claims priority under 35 U.S.C. §119 to U.S. Provisional Patent Application Ser. No. 61/415,180, filed Nov. 18, 2010 and entitled TOY VEHICLE RACEWAY AND ROLLING CART, the complete disclosure of which is incorporated herein by reference for all purposes.

FIELD OF THE DISCLOSURE

This disclosure relates to raceways for toy vehicles, and to rolling carts for such raceways.

BACKGROUND

People of all ages enjoy playing with toy vehicles. MATCHBOX® and HOT WHEELS® toy vehicles, for example, have been enjoyed by children and collectors alike since the mid 20th Century.

Toy vehicles may be enjoyed with accessories including play structures incorporating tracks, roadways, and other structures configured for toy vehicle play.

Examples of play structures with tracks for toy vehicles are disclosed in U.S. Pat. Nos. 7,651,398, 6,913,508, 6,647,893, 6,358,112, 6,099,380, 4,349,983, and 4,077,628. Examples of finish order indicators are disclosed in U.S. Pat. Nos. 5,651,736, 4,715,602, 3,618,947, 3,502,332, 3,376,844, 3,315,632, and 1,662,162. The disclosures of these and all other publications referenced herein are incorporated by reference in their entirety for all purposes.

SUMMARY

Toy vehicle raceways according to the present disclosure may include a plurality of track segments configured to provide pathways for toy vehicles. The raceways may also include a starting gate and a finishing order indicator. The starting gate may be configured to retain toy vehicles in a starting position and further configured to release the toy vehicles to roll down the pathways.

In some examples, toy vehicle raceways according to the present disclosure may be configured to be disassembled, collapsed, and/or folded into a travel or transport configuration for easy transportation and storage.

In some embodiments, a raceway may include three track segments and three stand or bracket portions. The three track segments may be configured to connect to each other with a friction fit or snap-together tab-and-slot mechanism to facilitate assembly and disassembly. One or more of the track segments may include multiple folding sub-segments to further enable collapsing of the raceway for storage or transportation. Each of the three bracket portions may be hingedly attached to a track portion and configured to provide support and positioning for the raceway when it is deployed in a racing configuration. At least one of the bracket portions may include wheels. In a deployed racing configuration, the track segments may be supported at an angle such that a general downward slope is achieved from the starting gate to the finishing order indicator, with a final track portion ending flat against a support surface such as a table or floor. A finishing order indicator may provide suitable audio and/or visual indication of toy vehicle finishing order. In a travel or transport configuration, the track portions and finish line gate may be disconnected and folded into a stable, compact stack, such that a wheeled bracket portion is disposed at one end to facilitate rolling transport and another bracket portion may function as a carrying or pull handle for the assembly, such that the combination forms a rolling cart.

Advantages of the present disclosure will be more readily understood after considering the drawings and the Detailed Description.

DETAILED DESCRIPTION OF THE DISCLOSURE

Figure 1:
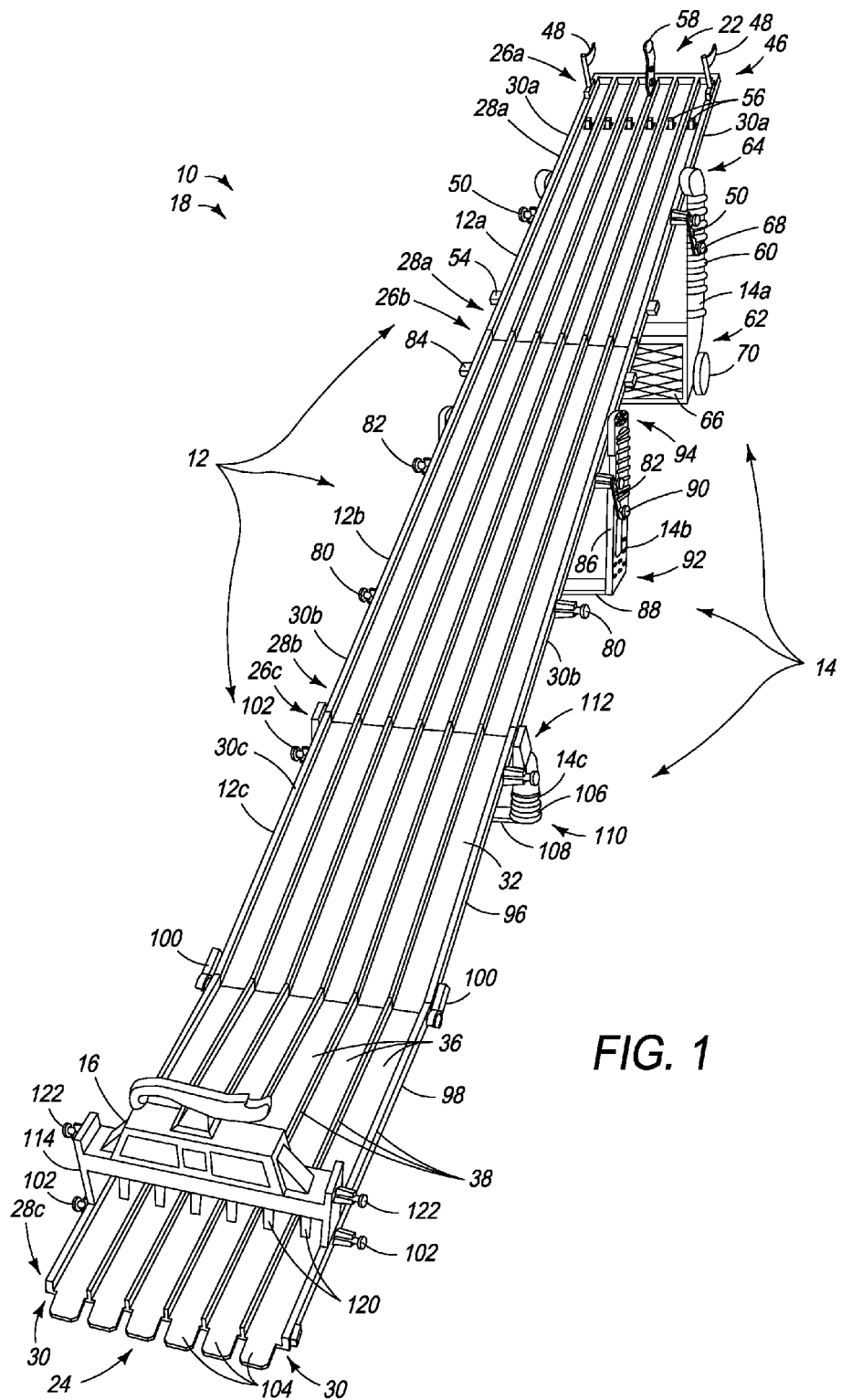
FIG. 1 is a front perspective view of an assembled raceway.

A toy vehicle raceway 10 is depicted generally in FIGS. 1-12. Unless otherwise specified, toy vehicle raceway 10 may, but is not required to contain at least one of the structure, components, functionality, and/or variations described, illustrated, and/or incorporated herein. As illustrated in FIG. 1, toy vehicle raceway 10 may include a plurality of connectable track segments 12, support brackets 14, and/or finishing order indicator 16. Toy vehicle raceway 10 may be capable of being assembled into a plurality of configurations. For example, raceway 10 may be capable of being assembled in a racing configuration 18 and a transport configuration 20.

Figure 2:
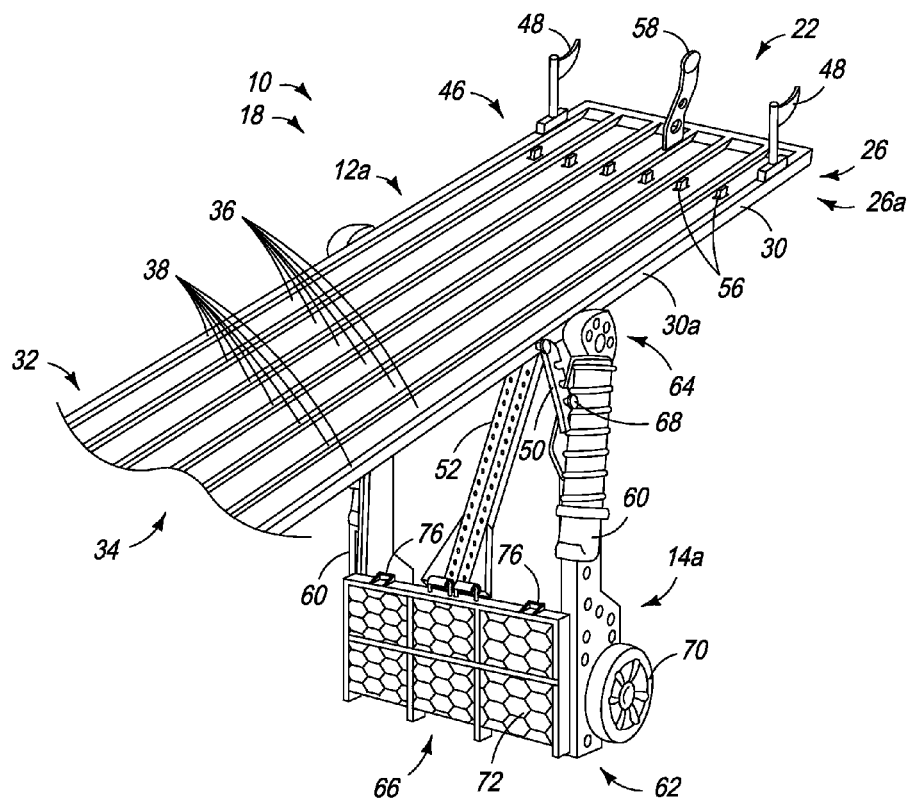
FIG. 2 is a side perspective view of a portion of the assembled raceway of FIG. 1.

In racing configuration 18, illustrated in FIGS. 1 and 2, the track segments 12 of raceway 10 may be assembled as a ramped toy vehicle raceway, with one or more support brackets 14 elevating a first end of raceway of raceway 22, and may generally slope downward to a second end of raceway 24. In racing configuration 18, finishing order indicator 16 may also be attached near second end of raceway 24. In transport configuration 20, illustrated in FIG. 3, track segments 12 and finishing order indicator 16 may be collapsed, disconnected, and/or folded, with one or more of track segments 12 and support brackets 14 forming a rolling cart 210 for securely carrying the remaining components.

Track segments 12 may be any suitable structure configured to facilitate racing of toy vehicles in lanes. For example, each one of track segments 12 may be constructed as rigid or semi-rigid, substantially planar plates having a first end 26, a second end 28, and two opposing side edges 30. Each one of track segments 12 may also include a racing surface 32 on one planar face and a non-racing surface 34 on an opposite planar face.

Racing surface 32 may be any textured or untextured surface suitable for toy vehicle travel. For example, racing surface 32 may include a plurality of lanes 36 formed by one or more upstanding longitudinal ribs 38, sized and spaced to facilitate guided travel of toy vehicles down each one of the plurality of lanes 36. In some examples, each one of track segments 12 includes six lanes 36.

Non-racing surface 34 may be any textured or untextured surface. For example, non-racing surface 34 may include texturing and/or raised lettering to convey assembly information to a user. In other examples, non-racing surface 34 may be textured to take on an appearance of industrial machinery, support structures, or decorations.

Figure 12A:
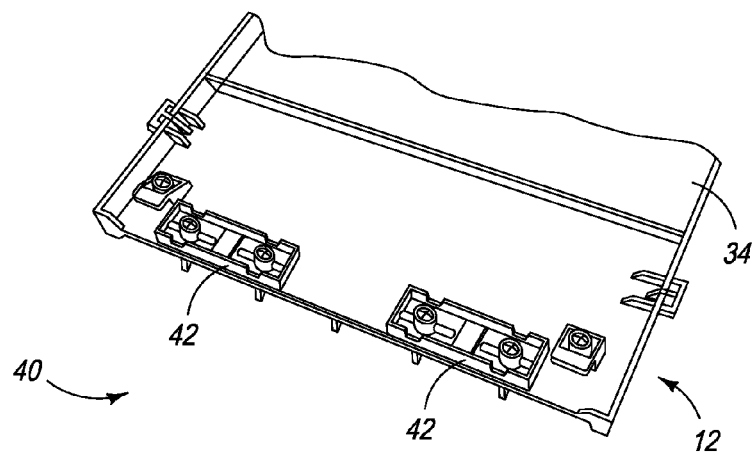
FIGS. 12A and 12B show a detailed view of illustrative track connectors.
Figure 12B:
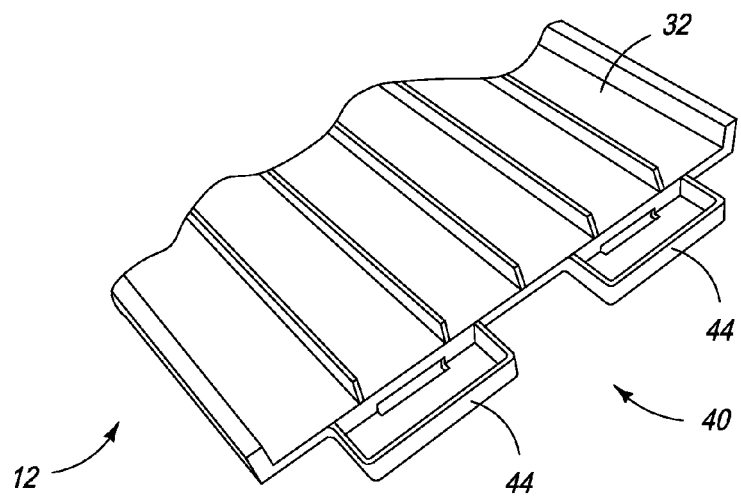

Each one of track segments 12 may also include track connectors 40 (See FIGS. 12A-12B) at first end 26 and/or second end 28. Track connectors 40 may be any structure suitable for facilitating selective end-to-end connection of one of track segments 12 to another one of track segments 12. In some examples, track connectors 40 include tongue and groove friction fit connectors. In other examples, track connectors 40 may be configured as snap-together nesting tabs such as male track connectors 42 and female track connectors 44. Illustrative male track connectors 42 are depicted in FIG. 12A. Illustrative female track connectors 44 are depicted in FIG. 12B.

More specifically, track segments 12 may include a first track segment 12a, a second track segment 12b, and a third track segment 12c. As described above, first track segment 12a may be described as a first substantially planar plate, second track segment 12b may be described as a second substantially planar plate, and third track segment 12c may be described as a third substantially planar plate.

First track segment 12a may be a track segment constructed as described above and configured to be disposed at first end of raceway 22 when in racing configuration 18. First track segment 12a may include a first end 26a, a second end 28a, side edges 30a, a racing surface 32a, a nonracing surface 34a, lanes 36a, longitudinal ribs 38a, track connectors 40a, starting gate assembly 46, flags 48, peg clips 50, brace 52, and/or side tabs 54. First track segment 12a may also be pivotably connected to a first support bracket or primary support stand such as primary support bracket 14a.

Starting gate assembly 46 may be disposed proximate first end 26a and may be any assembly configured to allow selective retention and substantially simultaneous release of toy racing vehicles at first end of raceway 22. For example, starting gate assembly 46 may include a plurality of retention/release members 56 operatively connected to an actuating member 58. Starting gate assembly 46 may be disposed in any suitable location to allow placement of toy racing vehicles in starting positions. Starting gate assembly 46 may be configured to selectively release a plurality of toy vehicles for travel along respective ones of the plurality of lanes 36, such as toward second end of raceway 24.

Starting gate assembly 46 may be configured to selectively retain toy vehicles proximate first end of raceway 22. For example, retention/release members 56 may be configured as tabs that project above racing surface 32 of lanes 36. Retention/release members 56 may be operatively linked to pivoting actuating member 58 below first track segment 12a by any suitable linking means configured to substantially change the height of retention/release members 56 above racing surface 32 upon displacement of actuating member 58. For example, there may be a rigid member connecting a lower end of actuating member 58 to lower ends of retention/release members 56 such that pivoting of actuating member 58 causes a simultaneous change in height of retention/release members 56.

Actuating member 58 may be selectively urged toward second end of raceway 24, such that the linked retention/release members 56 are lowered relative to racing surface 32, which thereby releases the plurality of toy vehicles for travel or racing. In other examples, the connection between actuating member 58 and retention/release members 56 may be through a spring-loaded cam and cam follower mechanism, such that lowering of retention/release members 56 is accomplished by urging actuating member 58 toward first end of raceway 22 rather than second end of raceway 24.

Actuating member 58 may also be hinged to allow actuating member 58 to collapse laterally and lie flat against racing surface 32a when in transport configuration 20.

Flags 48 may be any suitable element configured to indicate a starting location for racing vehicles. For example, flags 48 may be rigid or semi-rigid flag-shaped members hingedly attached to first track segment 12a near first end of raceway 22a.

Flags 48 may be configured to collapse laterally to lie flat against racing surface 32a when in transport configuration 20.

First track segment 12a may be pivotably attached to primary support bracket 14a at a location between first end 26a and second end 28a. In some examples, primary support bracket 14a may include two side members 60, each side member having a first end 62 and a second end 64, and a storage compartment 66 disposed between the two side members 60. For example, storage compartment 66 may be disposed near the first end 62 of side members 60, and side edges 30a of first track segment 12a may be pivotably attached between the two side members 60 at the second ends 64.

Peg clips 50 may be any suitable structures configured to selectively connect to one or more corresponding pegs or protrusions such as pegs 68 protruding from side members 60. For example, peg clips 50 may include latches rotatably connected to side edges 30a and may include a plurality of openings sized to receive and retain corresponding pegs in a snap-together or friction fit. Peg clips 50 may function to act as positioning, bracing, and/or retention members, depending on the nature and location of the corresponding protrusions.

Brace 52 may be any suitable structure configured to facilitate positioning and bracing of first track segment 12a when in racing configuration 18. In some examples, brace 52 is a rigid, elongate member pivotably attached at one end to nonracing surface 34a of first track segment 12a. Brace 52 may also be configured to clip or latch at a second end to a corresponding structure on storage compartment 66, thereby selectively locking first track segment 12a and primary support bracket 14a in an angled relationship.

Side tabs 54 may be any suitable structures configured as protrusions or extensions from side edges 30a near second end 28a. For example, side tabs 54 may be mushroom-shaped or T-shaped protrusions configured to interface with a corresponding slot or opening in another structure of raceway 10 when in transport configuration 20.

In addition to the above description, primary support bracket 14a may also include one or more wheels 70 and main retention clips 78. In some examples, two wheels 70 may be rotatably attached with one wheel 70 at first end 62 of each side member 60 such that primary support bracket 14a forms a wheeled primary support bracket. Attachment points may be disposed such that wheels 70 will not contact an underlying support surface when raceway 10 is in racing configuration 18, facilitating support for raceway 10 by a support structure formed by side members 60 and/or storage compartment 66. In other examples, one or more wheels 70 may be operatively attached to storage compartment 66, elsewhere on side members 60, or even to first track segment 12a.

Figure 11A:
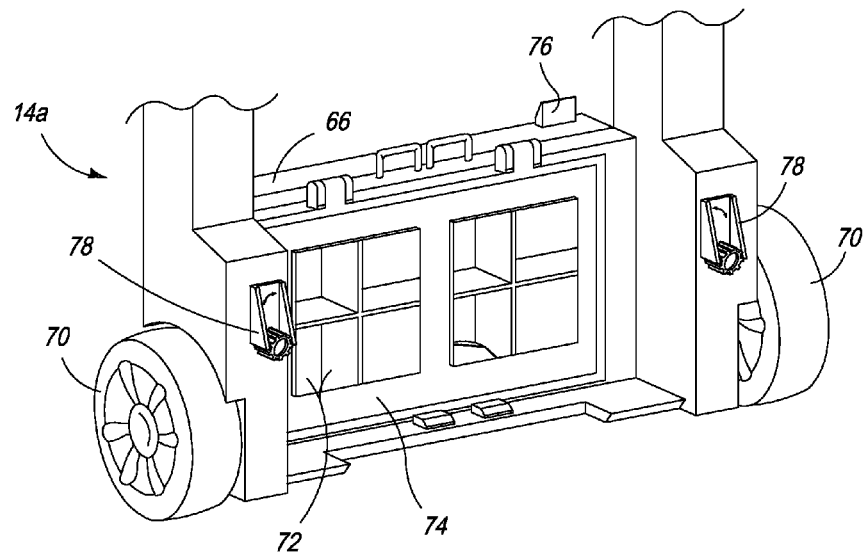
FIGS. 11A and 11B show a detailed view of an illustrative storage compartment.
Figure 11B:
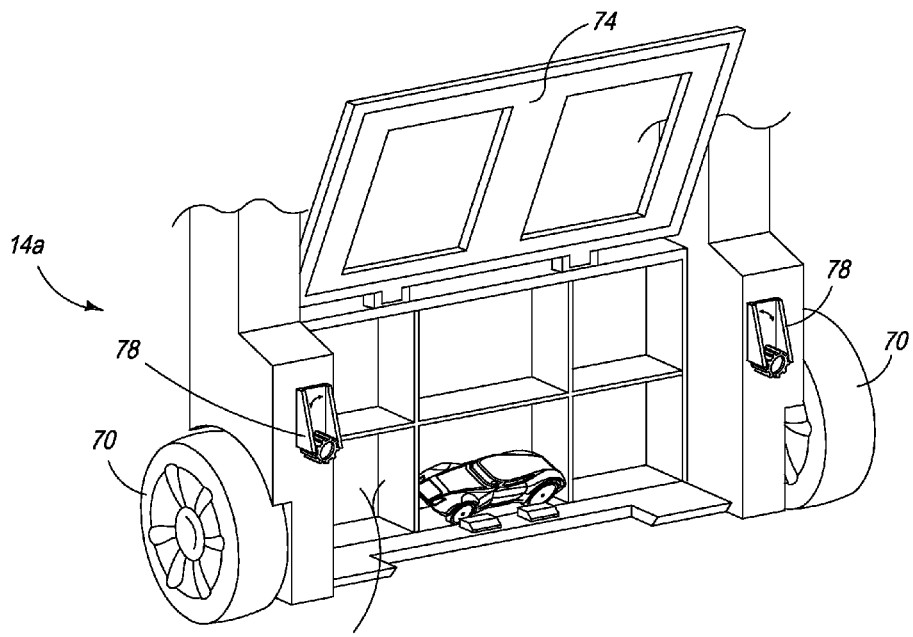

With reference to the example depicted in FIGS. 11A and 11B, storage compartment 66 may be any suitable structure sized and configured to retain toy racing vehicles. For example, storage compartment 66 may include compartment walls 72, door 74, and/or retention tabs 76. Compartment walls 72 may be planar structures arranged to form a rectilinear box-like compartment for storage of toy vehicles. Door 74 may be hinged to allow access to an interior of storage compartment 66 and latched or friction-fit to retain vehicles securely. Storage compartment 66 may be attached to side members 60 using fasteners or connectors, or may be formed as part of primary support bracket 14a.

Storage compartment 66 may act as a structural part of primary support bracket 14a. For example, storage compartment 66 may function as a cross-brace between side members 60. In other examples, storage compartment 66 may instead be attached to primary support bracket 14a and a separate cross-bracing structure may be provided for side members 60.

Retention tabs 76 of storage compartment 66 may be any suitably sized and shaped protrusions configured to facilitate retention of other raceway components as described below regarding FIG. 8.

With continuing reference to FIGS. 1 and 2, track segments 12 may be arranged end-to-end, forming a ramped, multi-lane raceway for toy vehicles when in racing configuration 18. For example, second end 28a of first track segment 12a may be connected to a first end 26b of second track segment 12b using track connectors 40.

Second track segment 12b may include first end 26b, a second end 28b, side edges 30b, pegs 80, peg clips 82, and/or tabs 84. Pegs 80 may be any suitable peg-like protrusions disposed to protrude laterally from side edges 30b. Pegs 80 may be sized to mate with peg clips 50 of first track segment 12a or other similar peg clips. Peg clips 82 of second track segment 12b may be disposed on side edges 30b, and may be constructed as latches substantially the same as peg clips 50 albeit with more or fewer openings. Tabs 84 may be any suitable structures configured as protrusions or extensions from side edges 30b near first end 26b. For example, tabs 84 may be mushroom-shaped or T-shaped protrusions configured to interface with a corresponding slot or opening in another structure of raceway 10 when in transport configuration 20.

Second track segment 12b may be further configured to pivotably attach to second support bracket 14b. In some examples, second support bracket 14b may include side members 86, a cross member 88 (See FIG. 7), and/or pegs 90. Side members 86 may each have a first end 92 and a second end 94. Cross member 88 may be disposed between side members 86 at first ends 92 of side members 86, and may be any suitable rigid structure configured to provide spacing and lateral support to second support bracket 14b.

Side edges 30b of second track segment 12b may pivotably attach between second ends 94 of side members 86. Second support bracket 14b may be capable of being pivoted between a supporting position in an angled relationship with second track segment 12b when in racing configuration 18, and a storage position wherein support bracket 14b and track segment 12b are substantially coplanar when in transport configuration 20.

Pegs 90 on second support bracket 14b may be configured as protrusions to which peg clips 82 on second track segment 12b may be attached, bracing and positioning second track segment 14b in an angled relationship with second support bracket 14b when in racing configuration 18.

With continuing reference to FIGS. 1 and 2 and the end-to-end arrangement of track segments 12 when in racing configuration 18, second end 28b of second track segment 12b may be connected to a first end 26c of third track segment 12c using track connectors 40.

Third track segment 12c may include first end 26c, a second end 28c, side edges 30c, a first track subsegment 96, a second track subsegment 98, a hinge 100, pegs 102, and/or tongue connectors 104. Third track segment 12c may be disposed at second end of raceway 24 when in racing configuration 18.

Third track segment 12c may be configured as two or more subsegments hinged together at a point between first end 26c and second end 28c to facilitate collapsibility and storage. This is possible because second end 28c of third track segment 12c may rest on a support surface rather than being elevated and attached to a following track segment 12, therefore reducing the need for a completely rigid structure to ensure a suitably ramped raceway.

In some examples, first track subsegment 96 may be operatively connected to second track subsegment 98 using breakaway hinge 100. Hinge 100 may include one or more friction-fit C-connector hinge mechanisms to allow hinge 100 to break away nondestructively given sufficient force.

Pegs 102 may be disposed on side edges 30c near first end 26c and/or second end 28c. Pegs 102 may be any suitable protrusion sized and configured to interface with peg clips 50 and or peg clips 82.

Tongue connectors 104 may be any suitable male connectors configured to connect with other track portions (not pictured) and thereby to allow raceway 10 to be included as part of a larger play structure or raceway. In some examples, each one of lanes 36 may include one of tongue connectors 104.

Third track segment 12c may be further configured to pivotably attach to third support bracket 14c. In some examples, third support bracket 14c may include side members 106 and/or a cross member 108. Side members 106 may each have a first end 110 and a second end 112. Cross member 108 may be disposed between side members 106 at first ends 110 of side members v106, and may be any suitable rigid structure configured to provide spacing and lateral support to third support bracket 14c.

Side edges 30c of third track segment 12c may pivotably attach between second ends 112 of side members 106. Third support bracket 14c may be capable of being pivoted between a supporting position in an angled relationship with third track segment 12c when in racing configuration 18, and a storage position wherein support bracket 14c and track segment 12c are substantially coplanar when in transport configuration 20.

Finishing order indicator 16 may be any suitable structure or component configured to indicate which one of lanes 36 corresponds to a winning toy vehicle. For example, finishing order indicator 16 may include a detachable, arch-like structure disposed proximate second end 28c. Finishing order indicator 16 may include side members 114, one or more visual indicators 116, an audio indicator, and/or physical vehicle interfaces 120.

In some examples, finishing order indicator 16 detects a passing vehicle via actuation of one or more switches 120. Switches 120 may include limit switches, paddles, fingers, or any other detection mechanism configured to provide indication that a toy racing vehicle has passed a fixed, predetermined location. For example, a switch member may extend downward from the arch of finishing order indicator 16 into each one of lanes 36 such that a passing toy vehicle may strike the switch member.

Striking a switch member of a switch 120 in turn may activate an electrical or electronic switch in a circuit of finishing order indicator 16. The circuit (not pictured) may be configured to determine which detection mechanism was first reached and to send a signal indicating the corresponding one of lanes 36. Finishing order indicator 16 may then indicate a winning lane number via one or more visual indicators 116 and/or audio indicators. For example, if a first, winning toy vehicle strikes a physical vehicle interface 120 in a lane designated as "lane 2," finishing order indicator 16 may light a lamp over lane 2, display a number "2" on a digital display, and/or cause an appropriate audio message to be announced by a speaker, such as "Winner, Lane 2!"

Side members 114 of finishing order indicator 16 may be configured to fit into corresponding openings on near edges 30c of third track segment 12c with a friction fit and/or other latching mechanism such that finishing order indicator 16 may be removable to facilitate storage and transport. Side members 114 may also include pegs 122 extending laterally and configured to interface with peg clips 50 and/or peg clips 82.

Figure 3:
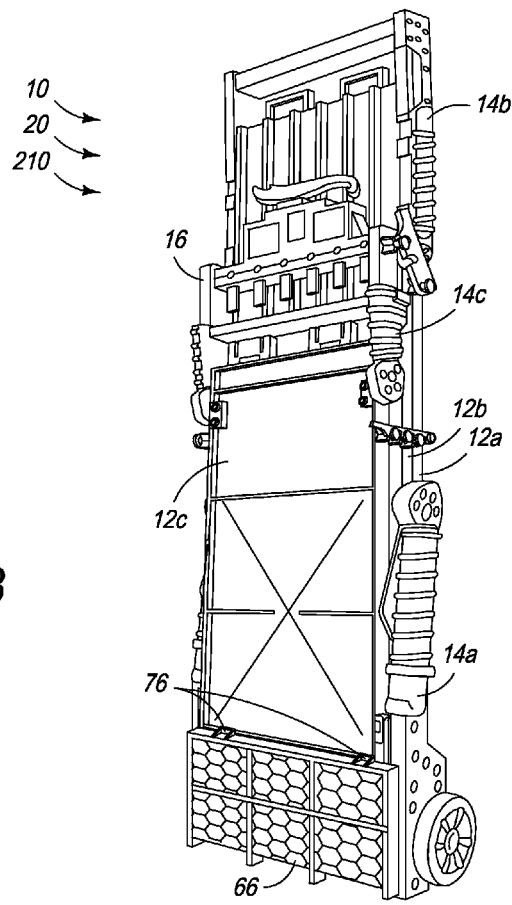
FIG. 3 is a perspective view of an illustrative raceway in a transport configuration.

In addition to racing configuration 18 described above, primary support bracket 14a and first track segment 12a may be capable of being arranged as a wheeled cart or rolling cart 210 so that some or preferably all of the components of raceway 10 may be securely bundled and carried when in transport configuration 20, as shown in FIG. 3. To convert to transport configuration 20, first track segment 12a may be disconnected from second track segment 12b, peg clips 50 may be disconnected from pegs 68, brace 52 may be disconnected from storage compartment 66, and first end 26a of first track segment 12a may be pivoted toward first end 62 of side members 60 until first track segment 12a is substantially coplanar with side members 60.

Figure 4:
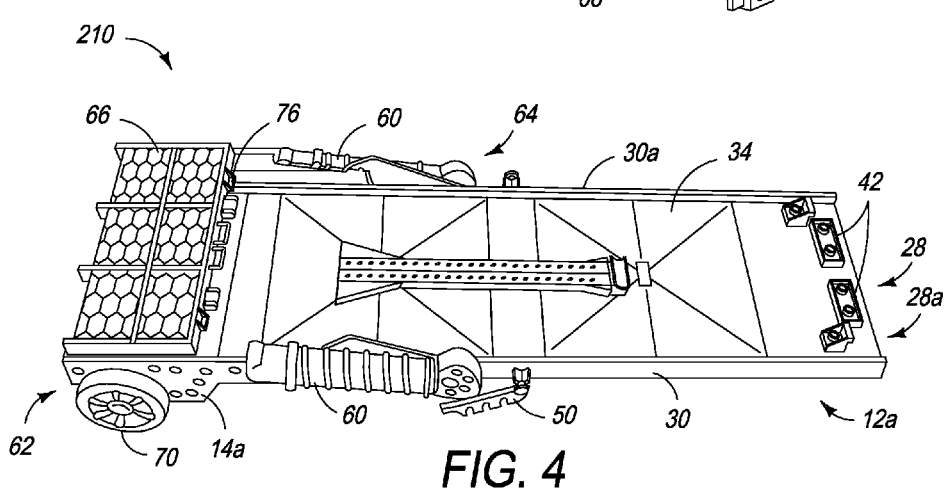
FIG. 4 is a perspective view of a collapsed upper section of an illustrative raceway.

Subsequently, main retention clips 78, which include at least partially-rotatable clips attached to the frame formed by primary support bracket 14a, may be rotated to partially extend over first track segment 12a, retaining primary support bracket 14a and first track segment 12a in a fixed, substantially coplanar relationship. Brace 52 may also be clipped to a corresponding connection point on non-racing surface of first track segment 12a. In this configuration, primary support bracket 14a can be said to form a frame for rolling cart 210. An illustrative collapsed first track segment 12a and primary support bracket 14a are depicted in FIG. 4.

Figure 5:
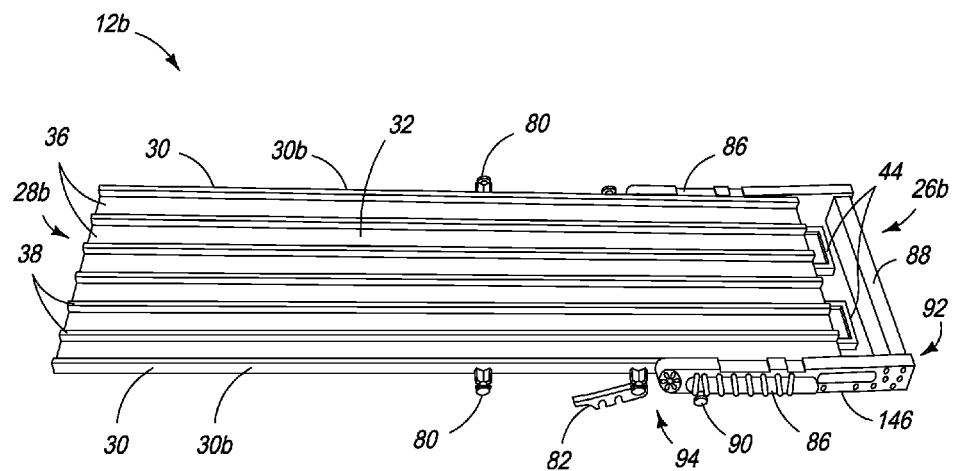
FIG. 5 is a perspective view of a collapsed middle section of an illustrative raceway.

Turning to FIG. 5, and as described above, second track segment 12b may be collapsed by disconnecting second track segment 12b from third track segment 12c, unclipping peg clips 82 of second track segment 12b from pegs 90 of second support bracket 14b and pivoting first end 92 of second support bracket 14b toward first end 26b. With second support bracket 14b substantially coplanar with second track segment 12b, tabs 84 may be configured to fit into a gap or slot in second support bracket 14b.

Second support bracket 14b may be further configured such that the pivoting connection with second track segment 12b allows both pivoting and longitudinal displacement. For example, a portion of this pivoting connection (not shown) may have a keyhole shape such that when support bracket 14b and track segment 12b are substantially coplanar, support bracket 14b may be displaced longitudinally to engage and retain tabs 84, thereby selectively locking support bracket 14b and track segment 12b in a fixed coplanar relationship. This configuration is desirable because second support bracket 14b may form a handle when assembled in transport configuration with the rolling cart 210 formed by first track segment 12a and primary support bracket 14a. Accordingly, the handle may function to carry or pull rolling cart 210, and this activity is best facilitated by ensuring a substantially rigid or fixed connection.

Figure 6:
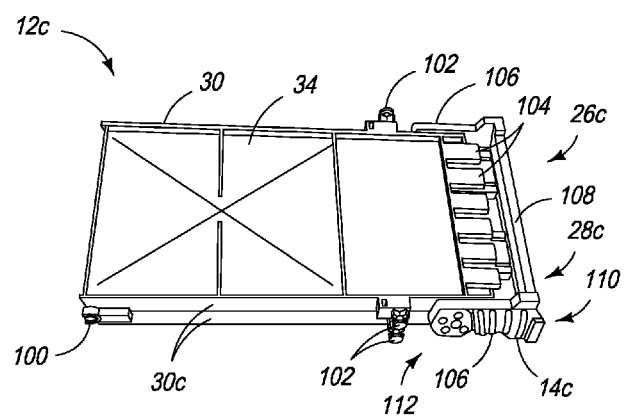
FIG. 6 is a perspective view of a collapsed lower section of an illustrative raceway.

Turning now to FIG. 6, third track segment 12c may be collapsed by removing finishing order indicator 16, folding second end 28c toward first end 26c, and pivoting first end 110 of third support bracket 14c toward first end 26c of third track segment 12c. In this configuration, first subsegment 96 and second subsegment 98 may be in a stacked relationship, and third support bracket 14c may be substantially coplanar with the stacked subsegments.

After collapsing track segments 12 and support brackets 14 as described, the various components may be assembled and secured on rolling cart 210 formed by first track segment 12a and primary support bracket 14a.

Figure 7:
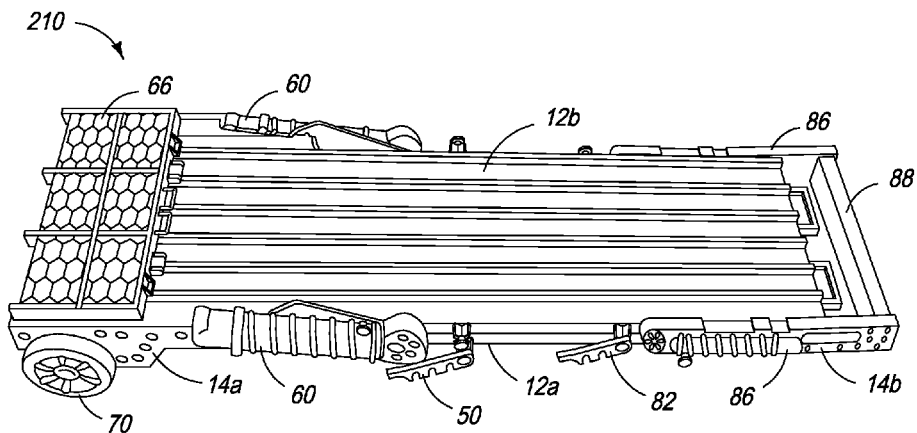
FIG. 7 is a perspective view of a partially arranged raceway showing a middle section of an illustrative raceway stacked on an upper section of an illustrative raceway.

FIG. 7 depicts a partially arranged raceway 10 showing a collapsed second track segment 12b stacked on top of rolling cart 210. In this partially arranged configuration, collapsed second track segment 12b may be stacked on collapsed first track segment 12a by placing second end 28b into a gap formed between storage compartment 66 and first track segment 12a such that non-racing surfaces 34 of the two track segments are facing each other. This arrangement may be further facilitated by including tabs or scalloping (not shown) on a suitable surface of storage compartment 66 to ensure second track segment 12b may only be fitted into the described gap if non-racing surface 34 of segment 12b is facing segment 12a.

As shown in FIG. 7, the handle formed by second support bracket 14b is disposed at first end 26b of second track segment 12b and at an end opposite to wheels 70, further facilitating the operation of rolling cart 210. Side tabs 54 of first track segment 12a may also be configured to fit into a gap in the handle formed by second support bracket 14b, further facilitating alignment, engagement, and retention of raceway components.

Figure 8:
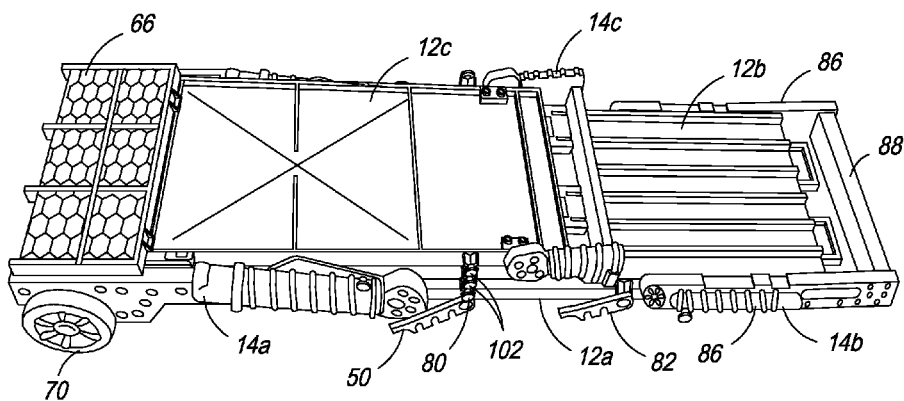
FIG. 8 is a perspective view of a partially arranged raceway showing a lower section of an illustrative raceway stacked on the arrangement of FIG. 7.
Figure 9:
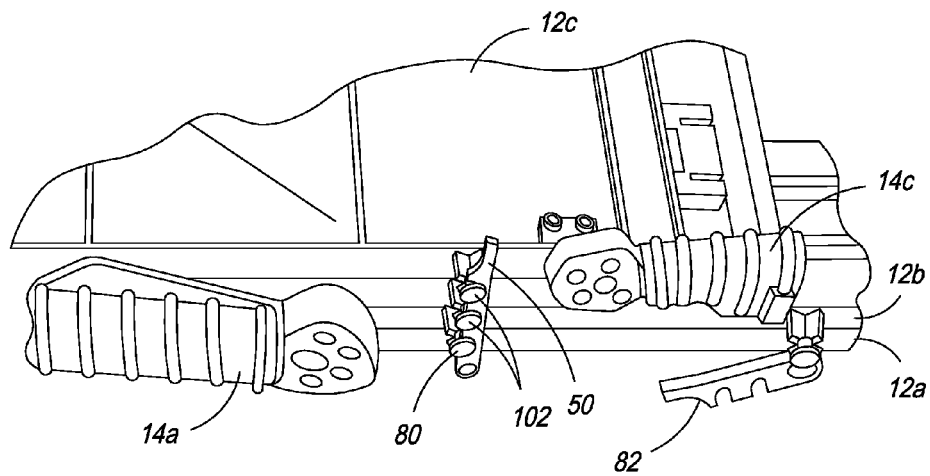
FIG. 9 shows a detailed view of an illustrative clip used to secure the arrangement of FIG. 8.
Figure 10:
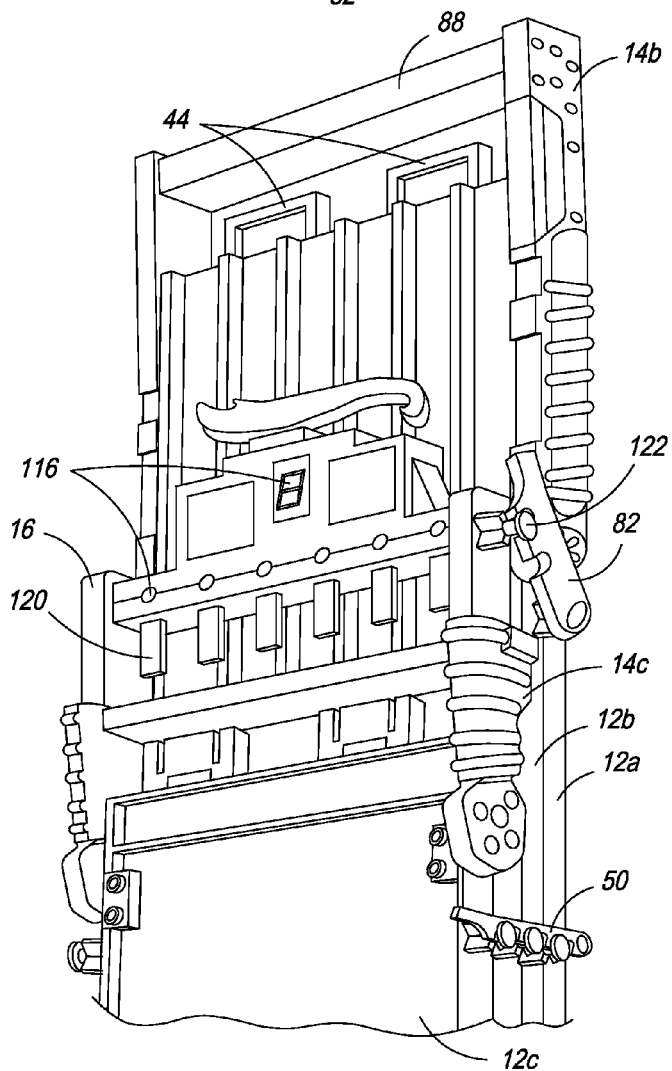
FIG. 10 shows an illustrative finishing order indicator secured to the arrangement of FIG. 8.

FIG. 8 depicts a partially arranged raceway 10 showing a collapsed third track segment 12c stacked on top of the partial arrangement of the other two track segments 12 described above. In this configuration, collapsed third track segment 12c may be stacked on second track segment 12b by placing an end of the collapsed segment away from third support bracket 14c into a gap formed between tabs 76 and racing surface 32 of second track segment 12b. In this arrangement, pegs 80 of second track segment 12b and pegs 102 of third track segment 12c may be in linear alignment with peg clips 50 of primary support bracket 14a. As shown in FIG. 9, this facilitates engagement of pegs 80 and pegs 102 by peg clips 50, which effectively secures all three track segments 12 in a close, stacked relationship.

Finishing order indicator 16 may be secured to the assembled components described above by inserting side members 114 into corresponding openings in third support bracket 14c. Finishing order indicator 16 may be further secured by engaging pegs 122 with peg clips 82.

From the above description, it may be seen that rolling cart 210 may also be described as capable of being placed in a first configuration (transport configuration 20) and a second configuration (racing configuration 18), the first configuration having the first substantially planar plate of first track segment 12a held by retention clips 78 in a position substantially coplanar with the frame of primary support bracket 14a, and the second and third plates of second track segment 12b and third track segment 12c retained by the frame with the handle formed by second support bracket 14b disposed at an end opposite the first end of the frame, and the second configuration having the first plate pivoted to form an angle with the frame, the second plate pivoted to form an angle with the handle, and the first plate, the second plate, and third plate assembled end to end to form a ramped raceway supported in part by the frame and the handle.

From the above description, it may also be seen that various other combinations and embodiments of the described elements may be comprehended. In some examples, a toy vehicle raceway 10 may have more or fewer than three track segments. In some examples, track segments may remain attached in both racing and transport configurations, such as by pivotably attaching segments with connectors having multiple degrees of freedom. In other examples, more or fewer than one storage compartment may be included. In some examples, a rolling cart may be configured to be capable of standing upright without external support. In other examples, more or fewer than six lanes may be provided.

The disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The following reference numerals appear in the drawings:

| | |
|---|---|
| 10 | Raceway |
| 12 | Track segments |
| 12a | First track segment |
| 12b | Second track segment |
| 12c | Third track segment |
| 14 | Support Brackets |
| 14a | Primary support bracket/frame |
| 14b | Second support bracket/handle |
| 14c | Third support bracket |
| 16 | Finishing order indicator |
| 18 | Racing configuration |
| 20 | Transport configuration |
| 22 | First end of raceway |
| 24 | Second end of raceway |
| 26 | 1st end of track segment |
| 26a | 1st end of first track segment |
| 26b | 1st end of second track segment |
| 26c | 1st end of third track segment |
| 28 | 2nd end of track segment |
| 28a | 2nd end of first track segment |
| 28b | 2nd end of second track segment |
| 28c | 2nd end of third track segment |
| 30 | Side edges of track segment |
| 30a | Side edges (first segment) |
| 30b | Side edges (second segment) |
| 30c | Side edges (third segment) |
| 32 | Racing surface |
| 34 | Non-racing surface |
| 36 | Lanes |
| 38 | Ribs |
| 40 | Track connectors |
| 42 | Male track connectors |
| 44 | Female track connectors |
| 46 | Starting gate assembly |
| 48 | Flags |
| 50 | Peg clips (first segment) |
| 52 | Brace |
| 54 | Side tabs |
| 56 | Retention/release members |
| 58 | Actuating member |
| 60 | Side members (primary) |
| 62 | 1st end (primary side members) |
| 64 | 2nd end (primary side members) |
| 66 | Storage compartment |
| 68 | Pegs on primary support |
| 70 | Wheels |
| 72 | Walls of storage compartment |
| 74 | Door |
| 76 | Tabs on storage compartment |
| 78 | Main retention clips |
| 80 | Pegs (second segment) |
| 82 | Peg clips (second segment) |
| 84 | Tabs (second segment) |
| 86 | Side members (second bracket) |
| 88 | Cross member (second bracket) |
| 90 | Pegs (second side members) |
| 92 | 1st end (second side members) |
| 94 | 2nd end (second side members) |
| 96 | First subsegment |
| 98 | Second subsegment |
| 100 | Hinge |
| 102 | Pegs (third track segment) |
| 104 | Tongue connectors |
| 106 | Side members (third bracket) |
| 108 | Cross member (third bracket) |
| 110 | 1st end (third side members) |
| 112 | 2nd end (third side members) |
| 114 | Side members of finish gate |
| 116 | Visual indicator |
| 120 | Physical vehicle interfaces |
| 122 | Pegs of finish gate |
| 210 | Rolling cart |

What is claimed is:

1. A toy raceway comprising:
a plurality of connectable track segments each including a plurality of lanes; and
a wheeled primary support bracket pivotably connected to a first track segment;
wherein the track segments and primary support bracket are capable of being configured in a racing configuration and a transport configuration;
the racing configuration having the track segments connected end-to-end forming a ramped, multilane raceway with the primary support bracket elevating a first end of the raceway; and
the transport configuration having the primary support bracket configured as a wheeled cart for carrying the track segments; and
wherein the first track segment further includes latches configured to both brace the raceway in the racing configuration and retain other track segments in the transport configuration.

2. The toy raceway of claim 1, further including a secondary support bracket pivotably connected to a second track segment.

3. The toy raceway of claim 2, wherein the secondary support bracket forms a handle when the raceway is in the transport configuration.

4. The toy raceway of claim 1, wherein one of the track segments includes two pivotably connected subsegments.

5. The toy raceway of claim 4, wherein the pivotably connected subsegments are connected by a breakaway hinge.

6. The toy raceway of claim 1, wherein the primary support bracket includes a support structure having two wheels disposed such that a surface of the support structure contacts a supporting surface when the raceway is in the racing configuration.

7. The toy raceway of claim 1, wherein the primary support bracket includes a storage compartment.

8. The toy raceway of claim 1, wherein the raceway has a second end, and a track segment at the second end includes male connectors configured to allow connection of one or more additional track portions.

9. The toy raceway of claim 1, wherein each track segment includes six lanes.

10. The toy raceway of claim 1, wherein the raceway has a second end and further includes a finishing order indicator disposed proximate the second end when the raceway is in the racing configuration.

11. The toy raceway of claim 10, wherein the finishing order indicator is detachable and configured to be securely carried by the wheeled cart when the raceway is in the transport configuration.

12. A toy raceway comprising:
a plurality of track segments configured to assemble into a ramped raceway having a primary support stand including two wheels and a plurality of latches;
wherein the primary support stand is configured to function as a wheeled cart for securely carrying the track segments when the track segments are disassembled;
wherein the primary support stand is pivotably connected to one of the track segments; and
the one of the track segments includes a plurality of lanes; and
wherein the plurality of track segments include a first track segment with latches configured to brace the raceway in a racing configuration having the plurality of track segments connected end-to-end forming a ramped, multi-lane raceway with the primary support stand elevating a first end of the raceway and to retain other track segments in the transport configuration; and
wherein the same latches are also configured to retain the plurality of track segments in a transport configuration having the primary support stand configured as a wheeled cart for carrying the plurality of track segments.

13. The toy raceway of claim 12, wherein the primary support stand further includes a storage compartment sized to allow storage of at least one toy vehicle.

14. The toy raceway of claim 12, wherein the track segments assemble end to end in a friction fit connection.

15. The toy raceway of claim 12, wherein:
the primary support stand includes two side members each having a first end and a second end;
a storage compartment is disposed between the two side members near the first ends of the side members;
the two wheels are attached to the two side members near the first ends of the side members; and
and side edges of one of the track segments are each pivotably attached between the two side members at the second ends.

16. The toy raceway of claim 12, wherein each track segment includes a plurality of lanes.

17. The toy raceway of claim 16, further including a detachable finish order indicator.

18. The toy raceway of claim 17, wherein the finish order indicator includes a toy vehicle-activated switch associated with each lane and an electronic circuit configured to determine and display a lane number associated with a winning toy vehicle.

19. The toy raceway of claim 18, wherein the finish order indicator further includes an electronic circuit operatively connected to a speaker and configured to provide an audible signal.

20. A toy raceway comprising:
a plurality of connectable track segments each including a plurality of lanes;
a wheeled primary support bracket pivotably connected to a first track segment;
a secondary support bracket pivotably connected to a second track segment;
wherein the track segments and primary support bracket are capable of being configured in a racing configuration and a transport configuration;
the racing configuration having the track segments connected end-to-end forming a ramped, multilane raceway with the primary support bracket elevating a first end of the raceway; and
the transport configuration having the primary support bracket configured as a wheeled cart for carrying the track segments; and
wherein the secondary support bracket forms a handle when the raceway is in the transport configuration with the track segments folded into a compact stack.

21. The toy raceway of claim 20, wherein one of the track segments includes two pivotably connected subsegments.

22. The toy raceway of claim 21, wherein the pivotably connected subsegments are connected by a breakaway hinge.

23. The toy raceway of claim 20, wherein the primary support bracket includes a support structure having two wheels disposed such that a surface of the support structure contacts a supporting surface when the raceway is in the racing configuration.

24. The toy raceway of claim 20, wherein the primary support bracket includes a storage compartment.

25. The toy raceway of claim 20, wherein the raceway has a second end, and a track segment at the second end includes male connectors configured to allow connection of one or more additional track portions.

* * * * *